US008685492B2

(12) United States Patent
Takahashi et al.

(10) Patent No.: US 8,685,492 B2
(45) Date of Patent: Apr. 1, 2014

(54) METHOD FOR PRODUCING DOUBLE-SIDED PRESSURE-SENSITIVE ADHESIVE SHEET

(75) Inventors: Akiko Takahashi, Ibaraki (JP); Mami Ikeya, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 158 days.

(21) Appl. No.: 11/950,977

(22) Filed: Dec. 5, 2007

(65) Prior Publication Data

US 2008/0138617 A1 Jun. 12, 2008

(30) Foreign Application Priority Data

Dec. 7, 2006 (JP) ................................ 2006-330516

(51) Int. Cl.
*B05D 5/10* (2006.01)

(52) U.S. Cl.
USPC .............. 427/208; 427/207.1; 427/208.4; 428/214; 428/500; 428/523

(58) Field of Classification Search
USPC ............ 427/207.1, 208, 208.4; 428/214, 500, 428/523
See application file for complete search history.

(56) References Cited

U.S. PATENT DOCUMENTS

| | | | | |
|---|---|---|---|---|
| 4,229,472 | A * | 10/1980 | Suskind et al. | 428/113 |
| 6,020,408 | A * | 2/2000 | Suzuki et al. | 524/265 |
| 6,485,589 | B1 * | 11/2002 | Johnson et al. | 156/83 |
| 6,656,567 | B1 * | 12/2003 | Abe et al. | 428/141 |
| 2001/0025083 | A1 * | 9/2001 | Stark et al. | 525/222 |
| 2001/0034408 | A1 * | 10/2001 | Kuroda et al. | 525/100 |
| 2002/0017555 | A1 * | 2/2002 | Taylor et al. | 229/122.32 |
| 2002/0114947 | A1 * | 8/2002 | Tanabe et al. | 428/343 |
| 2003/0138572 | A1 * | 7/2003 | Neuhaus-Steinmetz et al. | 427/458 |
| 2005/0098918 | A1 * | 5/2005 | Liang | 264/146 |
| 2005/0209380 | A1 * | 9/2005 | Wada et al. | 524/270 |
| 2006/0100357 | A1 * | 5/2006 | Bunn et al. | 524/556 |
| 2006/0116455 | A1 | 6/2006 | Naito et al. | |
| 2007/0036971 | A1 * | 2/2007 | Inada et al. | 428/355 EP |

FOREIGN PATENT DOCUMENTS

EP    1 661 962 A1    5/2006
JP    57-078471 A     5/1982

(Continued)

OTHER PUBLICATIONS

Benedek, *Pressure-Sensitive Adhesives and Applications*, 2nd edition (Marcel Dekker, Inc., New York, 2004), pp. 525-526.
Japanese Adhesive Tapes Manufacturers Association, *Pressure sensitive Adhesive Handbook*, 3rd edition (Oct. 1, 2005), pp. 86-87, English translation.

(Continued)

*Primary Examiner* — Michael Cleveland
*Assistant Examiner* — Xiao Zhao
(74) *Attorney, Agent, or Firm* — Leydig, Voit & Mayer, Ltd.

(57) ABSTRACT

A method is provided for producing a double-sided pressure-sensitive adhesive (PSA) sheet of a nonwoven fabric substrate, whereby the inherent performance of the PSA is more fully exploited using an aqueous dispersion-type PSA composition. This method comprises preparing an aqueous dispersion-type PSA composition and a nonwoven fabric substrate serving as a support. The method also comprises forming PSA layers which impregnate the substrate and which are obtained by drying the composition. These PSA layers impregnate the substrate so that the area of gaps observed in a vertical cross-section perpendicular to the machine direction of the substrate is about 500 μm²/400 μm or less.

19 Claims, 4 Drawing Sheets

(56) References Cited

FOREIGN PATENT DOCUMENTS

| JP | 57-115479 | A1 | 7/1982 |
|---|---|---|---|
| JP | 04-045184 | A | 2/1992 |
| JP | 05-271634 | A | 10/1993 |
| JP | 06-128543 | A | 5/1994 |
| JP | 06-145623 | A | 5/1994 |
| JP | 07-224262 | A | 8/1995 |
| JP | 09-255923 | A | 9/1997 |
| JP | 2001-152111 | A | 6/2001 |
| JP | 2002-356660 | A | 12/2002 |
| JP | 2003-105298 | A | 4/2003 |
| JP | 2003-171560 | A | 6/2003 |
| JP | 2004-051833 | A | 2/2004 |
| JP | 2004-067875 | A | 3/2004 |
| JP | 2004-202308 | A | 7/2004 |
| JP | 2006-096895 | A | 4/2006 |
| JP | 2006-143856 | A | 6/2006 |
| JP | 2006-152128 | A | 6/2006 |
| JP | 2006-274143 | A | 10/2006 |

OTHER PUBLICATIONS

Japanese Patent Office, Notification of Reasons for Refusal in Japanese Patent Application No. 2006-330516 (May 7, 2009), English translation.

Japanese Patent Office, Presentation of Publications and the Like in Japanese Patent Application No. 2006-330516 (Aug. 5, 2009), English translation.

Japanese Patent Office, Notification of Reasons for Refusal in Japanese Patent Application No. 2006-330516 (Oct. 22, 2009), English translation.

Chinese Patent Office, Office Action issued in Chinese Patent Application No. 200710198812.1 (Feb. 21, 2012), English translation.

Japanese Patent Office, Notice of Reasons for Refusal in Japanese Patent Application No. 2009-287488 (Aug. 9, 2012), English translation.

Chinese Patent Office, Second Notice of the Opinion on Examination in Chinese Patent Application No. 200710198812.1 (Aug. 31, 2012), English translation.

* cited by examiner

METHOD FOR PRODUCING DOUBLE-SIDED PRESSURE-SENSITIVE ADHESIVE SHEET

BACKGROUND OF THE INVENTION

1. Field of the Invention

The present invention relates to a method for producing a double-sided pressure-sensitive adhesive sheet (PSA sheet) using an aqueous dispersion-type pressure-sensitive adhesive (PSA) composition with a nonwoven fabric as a substrate, and more specifically relates to a method for producing a double-sided PSA sheet whereby the inherent performance of the adhesive is more properly reflected in the produced PSA sheet.

This patent application claims priority from Japanese Patent Application Publication No. 2006-330516 filed on Dec. 7, 2006, the entire contents of which are incorporated herein by reference.

2. Description of the Related Art

Double-sided PSA sheets using a nonwoven fabric as a substrate (support) are widely used in household appliances, automobiles, office automation equipment and various other fields as a convenient and reliable means of joining. Examples of documents of prior art relating to such double-sided PSA sheets include Japanese patent Application Publication Nos. 2004-067875, 2002-356660, 2006-143856 and 2001-152111.

Because of the way they are used, double-sided PSA sheets must have the property of adapting to the surface shape (including irregularities and curves) of the adherend, a property that can be evaluated in terms of strong curve adhesiveness or low repulsion. If adaptability is lacking, the double-sided PSA sheet will be liable to joint floating, peeling and the like when used for attachment to parts with complex surface shapes, as in the case of automobile interiors and the like.

In the past, the PSA compositions used in producing double-sided PSA sheets have generally been solvent-type compositions of adhesive components (polymers and the like) dissolved in organic solvents. In recent years, however, due to environmental concerns and the desire to reduce the amount of volatile organic compounds (VOCs) released from double-sided PSA sheets, there has been a trend toward aqueous dispersion-type (aqueous) PSA compositions comprising adhesive components dispersed in water. Such conversion to aqueous PSA compositions has been studied in a variety of fields not limited to PSA compositions for double-sided PSA sheets, and current development is aimed at aqueous dispersion-type PSA compositions capable of providing adhesive properties (including the adaptability discussed above) equal to or greater than those of solvent-type PSA compositions.

However, compared to double-sided PSA sheets using solvent-type PSA compositions, in the case of a double-sided PSA sheet comprising a nonwoven fabric substrate with PSA layers formed using an aqueous dispersion-type (typically emulsion-type) PSA composition, the inherent performance of the PSA may not be properly reflected in the performance of the double-sided PSA sheet. Specifically, even if the aqueous dispersion-type PSA composition is capable of forming a PSA layer that exhibits good adaptability with respect to the surface shape of an adherend as evaluated from the properties of the PSA layer itself (that is, the PSA film without the nonwoven fabric substrate), adaptability may be much less when a double-sided PSA sheet is actually formed on a nonwoven fabric substrate using the composition. This has been one factor inhibiting conversion from solvent-type PSA compositions to aqueous dispersion-type PSA compositions in the field of double-sided PSA sheets.

SUMMARY OF THE INVENTION

It is an object of the present invention to provide a method for producing a double-sided PSA sheet using an aqueous dispersion-type PSA composition with a nonwoven fabric as a substrate, which is a method for producing a double-sided PSA sheet whereby the inherent adhesive properties of the PSA (such as adaptability to the surface shape of the adherend) are more fully exploited. Another object of the present invention is to provide a double-sided PSA sheet produced by applying such a method.

With the present invention, a method is provided for using an aqueous dispersion-type PSA composition to produce a double-sided PSA sheet comprising PSA layers formed from that composition and a nonwoven fabric substrate supporting the PSA layers. This method comprises preparing an aqueous dispersion-type PSA composition. It also comprises preparing a nonwoven fabric substrate as the support. It also comprises forming PSA layers which are obtained by drying the PSA composition and which impregnate the nonwoven fabric substrate. These PSA layers impregnate the nonwoven fabric substrate to such a degree that the area of gaps observed in a vertical cross-section made perpendicular to the machine direction of the nonwoven fabric substrate is about 500 $\mu m^2$/400 $\mu m$ or less (or typically about 0 $\mu m^2$/400 $\mu m$ to 500 $\mu m^2$/400 $\mu m$).

By forming PSA layers impregnating the nonwoven fabric substrate to such a degree as to achieve such a gap area, it is possible to efficiently produce a double-sided PSA sheet wherein the inherent performance of the PSA (such as adaptability to the surface of an adherend) is better reflected even using an aqueous dispersion-type (aqueous) PSA composition.

A nonwoven fabric substrate with a grammage of 5 $g/m^2$ to 25 $g/m^2$ can be used by preference for the nonwoven fabric substrate. The thickness of this nonwoven fabric substrate is preferably in the range of about 15 $\mu m$ to 70 $\mu m$. It is desirable to use a nonwoven fabric substrate with a bulk density (calculated by dividing the grammage by the thickness) in the range of about 0.2 $g/cm^3$ to 0.5 $g/cm^3$. A nonwoven fabric substrate with these properties is desirable as the nonwoven fabric substrate in the method of the present invention because it allows for the easy formation of PSA layers that impregnate the material to such a degree as to achieve the gap area described above. It is also desirable because a double-sided PSA sheet using this nonwoven fabric substrate can be a double-sided PSA sheet with good adaptability to surface shape (that is, with low repulsion).

In a preferred mode of the disclosed method, the PSA layers are formed by laminating PSA films, which are obtained by drying the PSA composition, on both sides of the nonwoven fabric substrate. This mode provides the advantage of excellent productivity of the double-sided PSA sheet, and can also be easily adapted to nonwoven fabric substrates with low relative grammages and/or low bulk densities.

When forming the PSA layers, a pre-impregnation step may be included wherein the nonwoven fabric substrate is impregnated with a dilution of the PSA composition, which is then dried. This step allows a double-sided PSA sheet to be produced with a still lower gap area as discussed above. This pre-impregnation step also allows the type of nonwoven fabric substrate, the type of PSA composition, the PSA layer-forming conditions and the like to be selected from a wider range of choices. In other words, it increases the selection of materials and/or production conditions with which the gap area can be achieved.

An aqueous emulsion type PSA composition comprising primarily an acrylic polymer dispersed in water can be adopted by preference as the PSA composition.

The present invention also provides a double-sided PSA sheet produced by any of the methods disclosed here. This double-sided PSA sheet can have excellent adaptability to the surface shape of an adherend. In other words, it can be a double-sided PSA sheet that is not liable to floating, peeling or the like from the surface (that has low repulsion in other words) even when affixed to an adherend that does not have a flat surface shape.

DETAILED DESCRIPTION OF THE PREFERRED EMBODIMENTS

Desirable embodiments of the present invention are explained below. Any matters which are necessary for implementing the present invention, but which are not particularly mentioned in these Specifications can be considered design matters for a person skilled in the art based on prior art in the technical field. The present invention can be implemented based on the content disclosed in these Specifications and on common knowledge in the technical field.

Figure 1:
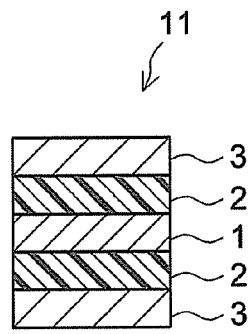
FIG. 1 is a cross-section showing a typical configuration of a double-sided PSA sheet.
Figure 2:
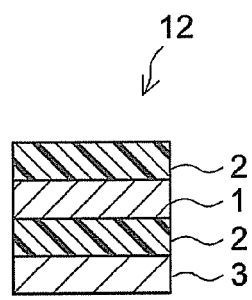
FIG. 2 is a cross-section showing another typical configuration of a double-sided PSA sheet.

A double-sided PSA sheet (which may be a long tape or the like) produced by applying the method of the present invention may, for example, have the cross-sectional structure shown schematically in FIG. 1 or FIG. 2. The PSA sheet 11 shown in FIG. 1 is configured with PSA layers 2 on both sides of nonwoven fabric substrate 1, with these PSA layers 2 being each protected by a release liner 3, which has a release surface at least on the side contacting the PSA layer. The PSA sheet 12 shown in FIG. 2 is configured with PSA layers 2 on both sides of nonwoven fabric substrate 1, with one of these PSA layers being protected by a release liner 3, both surfaces of which are release surfaces. This kind of PSA sheet 12 is configured so that when PSA sheet 12 is rolled so as to bring the other PSA layer into contact with the back of release liner 3, the other PSA layer can also be protected by release liner 3. In FIGS. 1 and 2, the boundaries between PSA layers 2 and nonwoven fabric substrate 1 are shown as straight lines for ease of illustration, but in fact, the lower parts (on the side of nonwoven fabric substrate 1) of PSA layers 2 on both sides of nonwoven fabric substrate 1 actually impregnate nonwoven fabric substrate 1.

The method disclosed here for producing a double-sided PSA sheet is one using an aqueous dispersion-type (typically emulsion-type) PSA composition, wherein PSA layers (shown as 2 in FIGS. 1 and 2) formed from this composition are provided impregnating a nonwoven fabric substrate (shown as 1) so as to achieve a gap area of about 500 $\mu m^2$/400 $\mu m$ or less. Preferably, the PSA layers are formed so that the gap area is about 250 $\mu m^2$/400 $\mu m$ or less (or more preferably about 100 $\mu m^2$/400 $\mu m$ or less). There is no lower limit on the gap area. Normally, it is appropriate to set the gap area as low as possible after considering the balance with properties other than repulsion resistance (strength of double-sided PSA tape, adhesive performance other than repulsion resistance, etc.) as well as material costs, productivity and the like.

The "gap area" here means, in a cross-section cut in the direction of thickness of a double-sided PSA sheet (vertical cross-section) along a cutting plane perpendicular to the machine direction (MD direction, typically the lengthwise direction of the sheet) of the nonwoven fabric substrate making up the double-sided PSA sheet, the area of gaps (open areas in the cross-section) observed per 400 $\mu m$ of the length of the cross-section (typically measured along with the width direction of the nonwoven fabric substrate). This gap area can be analyzed from a scanning electron microscopy (SEM) image of the cross-section at a magnification of 100× to 1000× (300× for example). The SEM sample can be prepared by ordinary methods, and for example the preparation methods described in the examples below (methods for evaluating substrate impregnation) can be employed by preference. The same applies to the SEM settings (measurement conditions) and methods for analyzing the SEM image. Preferably, the gap area is obtained for at least three (more preferably 5 or more, such as 5 to 10) different cross-sections at different cutting positions in the machine direction of the nonwoven fabric substrate, and the average of those values is used.

The types of PSA composition and nonwoven fabric substrate used (production method, composition, properties, etc.), the specific method of forming the PSA layers and the like are not particularly limited as long as such gap area is achieved.

For the nonwoven fabric substrate, for example, a nonwoven fabric substrate that is well-known and widely used in the field of double-sided PSA sheets, or another nonwoven fabric substrate, can be selected and used as appropriate as long as it allows PSA layers to be formed from an aqueous dispersion-type PSA composition with the specified gap area. A nonwoven fabric substrate composed of natural fiber such as wood fiber, cotton, manila hemp or the like; a nonwoven fabric substrate composed of a chemical fiber such as rayon, acetate fiber, polyester fiber, polyvinyl alcohol (PVA) fiber, polyamide fiber, polyolefin fiber, polyurethane fiber or the like; or a nonwoven fabric substrate composed of two or more fibers of different materials used together or the like can be used. A nonwoven fabric substrate impregnated with viscose, PVA, polyacrylamide or another resin (binder) may also be used. A more desirable example of a nonwoven fabric in the present invention is a nonwoven fabric substrate formed using viscose-treated fibers, or a nonwoven fabric substrate that has been viscose treated after formation of the nonwoven fabric (viscose rayon impregnation treatment).

The term "nonwoven fabric" is used here to indicate nonwoven fabrics for PSA sheets that are used mainly in the field of PSA tapes and other PSA sheets, and typically means nonwoven fabrics (sometimes called "papers") such as those prepared using ordinary papermaking equipment.

Desirable examples of means that can be employed for forming the PSA layers impregnating the nonwoven fabric substrate in the technique disclosed here include (1) a method in which an aqueous dispersion-type PSA composition is applied (typically by coating) on a release liner and dried to form a PSA film on the release liner, and the release liner with the PSA film is affixed to the nonwoven fabric substrate to thereby transfer (laminate) the PSA film to the nonwoven fabric substrate (hereunder sometimes called the "transfer method"); and (2) a method in which an aqueous dispersion-type PSA composition is directly applied (typically by coating) on a nonwoven fabric substrate and dried (hereunder sometimes called the "direct method" or "direct application method") and the like. These methods may also be combined.

From the standpoint of productivity of the double-sided PSA sheet, it is particularly desirable to adopt a method in which PSA films are laminated by the transfer method on both sides of the nonwoven fabric substrate (hereunder sometimes called the "double-sided transfer method"). It is therefore desirable to use a nonwoven fabric substrate with which the desired gap area can be achieved by such double-sided transfer method, or in other words a nonwoven fabric substrate that can be easily impregnated by the PSA film (PSA) pre-formed by drying the PSA composition. It is particularly desirable to select and use a nonwoven fabric substrate capable of forming a double-sided PSA sheet with the desired gap area (typically about 500 $\mu m^2/400$ $\mu m$ or less) when the nonwoven fabric substrate is subjected as is (without any particular pre-treatment such as the pre-impregnation treatment described below) to double-sided transfer method.

Consequently, another aspect of the invention disclosed here is a method for producing a double-sided PSA sheet comprising PSA layers formed using an aqueous dispersion-type PSA composition and a nonwoven fabric substrate supporting the PSA layers, the method comprising: preparing an aqueous dispersion-type PSA composition; selecting a nonwoven fabric substrate with which a gap area of 500 $\mu m^2/400$ $\mu m$ or less can be achieved when the PSA layers are formed as is (without pre-treatment such as pre-impregnation) by double-sided transfer method; and impregnating the selected nonwoven fabric substrate with PSA layers formed by drying the aforementioned PSA composition so that the gap area is 500 $\mu m^2/400$ $\mu m$ or less. The actual PSA layer formation method used to produce the double-sided PSA sheet using the selected nonwoven fabric substrate is not limited to double-sided transfer method. For example, one layer can be formed by the transfer method and the other by the direct method. The nonwoven fabric substrate may also be subjected to pre-impregnation or other pre-treatment when actually producing a double-sided PSA sheet using the selected nonwoven fabric substrate.

Although this is not a limitation, from the standpoint of allowing impregnation of the PSA (PSA film) when producing a double-sided PSA sheet by a transfer method (typically the double-sided transfer method), preferably used is a nonwoven fabric substrate with a grammage of about 5 $g/m^2$ to 25 $g/m^2$ (more preferably about 5 $g/m^2$ to 15 $g/m^2$). The thickness of the nonwoven fabric substrate is preferably in the range of about 15 $\mu m$ to 70 $\mu m$ (or more preferably about 15 $\mu m$ to 50 $\mu m$). It is also desirable to use a nonwoven fabric substrate with a bulk density (calculated by dividing the grammage by the thickness) of about 0.2 $g/cm^3$ to 0.5 $g/cm^3$ (such as about 0.25 $g/cm^3$ to 0.4 $g/cm^3$). If the bulk density is too far above this range, impregnation by the PSA film will tend to be inadequate. If the bulk density is too far below this range, impregnation by the PSA film will also tend to be inadequate. This is attributed to the fact that when the bulk density is too small, the nonwoven fabric substrate is excessively crushed (compressed in the direction of thickness) when the PSA film is laminated, making it difficult for the PSA to penetrate between the fibers making up the nonwoven fabric substrate.

Depending on the selection of nonwoven fabric substrate, the selection of PSA composition and the combination of these and the like, the gap area may not be sufficiently reduced if the nonwoven fabric substrate is subjected as is (without any particular pre-treatment) to double-sided transfer method. In such cases, a double-sided PSA sheet with a smaller gap area (or in other words with a greater degree of impregnation by the PSA layers) can be obtained if the PSA layers are formed by the direct method on one or both sides (preferably one side) of the nonwoven fabric substrate. For example, a PSA film can be first formed by the transfer method on one side of the nonwoven fabric substrate, and the PSA composition can then be applied (by direct application in other words) to form a PSA layer on the other side of the same nonwoven fabric substrate. Even in the case of a double-sided PSA sheet, the gap area of which could be sufficiently reduced (typically to a gap area of 500 $\mu m^2/400$ $\mu m$ or less) by the double-sided transfer method, the aforementioned direct method can of course be applied to one or both sides of the nonwoven fabric substrate. In this way, it is possible to produce a double-sided PSA sheet with a smaller gap area.

The PSA composition can be applied using a common coater such as a gravure roll coater, reverse roll coater, kiss roll coater, dip roll coater, bar coater, knife coater, spray coater or the like. Although this is not particularly a limitation, the applied amount of the PSA composition (here meaning the applied amount per PSA layer on one side of the nonwoven fabric substrate) can be such as to form a PSA layer of about 20 $\mu m$ to 150 $\mu m$ (typically about 40 $\mu m$ to 100 $\mu m$), for example, based on the solids component of the PSA. The preferred minimum applied amount may differ depending on the nonwoven fabric substrate used. Normally, a suitable applied amount is one that forms a PSA layer about 0.5 to 10 times (preferably about 1 to 5 times) the thickness of the nonwoven fabric substrate on one side of the nonwoven fabric substrate. If too little is applied, it may be difficult to achieve the desired gap area. The PSA composition is preferably dried with heat for purposes of promoting crosslinking reactions and improving productivity and the like. Depending on the material of the object of application (release liner and/or nonwoven fabric substrate), a drying temperature of about 40 to 120° C. can be adopted by preference.

Before the PSA layers are formed by the direct method or transfer method, can be performed as necessary a pre-impregnation treatment in which the nonwoven fabric substrate is first impregnated with a dilution of the PSA composition and then dried. The dilution for this pre-impregnation treatment is preferably prepared by diluting an aqueous (organic solvent-free) PSA composition such as an aqueous dispersion-type PSA composition, water-soluble PSA composition or the like with a solvent (typically water). Of these, it is desirable to use a dilution obtained by diluting an aqueous dispersion-type (typically emulsion-type) PSA composition with water. The PSA composition used to prepare this dilution and the PSA composition used to form the PSA layers (by the direct method or transfer method for example) on a nonwoven fabric substrate that has been pre-treated in this way may be the same composition or different compositions. Normally, it is simpler and more desirable to prepare a dilution for pre-impregnation by using a suitable solvent (typically water) to dilute the PSA composition that will be used to form the PSA layers. The solids concentration of the dilution used for pre-impregnation is not particularly limited, but can be about 5 to 50% for example. Normally, a dilution with a solids concentration of about 10 to 40% (such as about 20 to 35%) can be used by preference.

This pre-impregnation treatment can be applied to a nonwoven fabric substrate that has no PSA layer formed on either side, or to a nonwoven fabric substrate having a PSA layer formed (by the transfer method or direct method for example) on one or the other side. By then forming a PSA layer or layers by the transfer method, direct method or any other method or a combination of these on a nonwoven fabric substrate that has been pre-impregnated in this way, it is possible to produce a double-sided PSA sheet with a still lower gap area than that achieved without pre-impregnation treatment. This pre-impregnation treatment also allows the type of nonwoven fabric substrate, the type of PSA composition, the PSA layer formation conditions and the like to be selected from a broader range of options. In other words, it increases the range of alternative materials and/or production conditions with which the preferred gap area (such as about 500 $\mu m^2$/400 $\mu m$ or less) disclosed here can be achieved.

For the PSA composition used in the method disclosed here, an aqueous dispersion-type (typically emulsion-type) PSA composition comprising an acrylic, polyester, urethane, polyether, rubber, silicone, polyamide, fluorine or other known polymer as the adhesive component dispersed in water can be selected as appropriate. An example of a PSA composition that can be used by preference is an aqueous emulsion-type PSA composition in which the principle component is an acrylic polymer (that is, the mass percentage of the acrylic polymer in the nonvolatile part (solids part) of the PSA composition is over 50 mass %) that is dispersed in water.

This acrylic polymer may be a polymer obtained by polymerizing (typically by emulsion polymerization) a monomer raw material having an alkyl (meth)acrylate or in other words a (meth)acrylic acid ester of an alkyl alcohol as the principal constituent monomer. The alkyl (meth)acrylate making up this monomer raw material is preferably a (meth)acrylic acid ester of an alkyl alcohol with 2 to 20 (more preferably 4 to 10) carbon atoms. Specific examples of the alkyl group in this alkyl alcohol include the ethyl, propyl, isopropyl, butyl, isobutyl, pentyl, isopentyl, hexyl, heptyl, 2-ethylhexyl, isooctyl, isononyl, isodecyl and other groups. Particularly desirable examples of the alkyl (meth) acrylate include butyl (meth)acrylate and 2-ethylhexyl (meth)acrylate.

In addition to an alkyl (meth)acrylate as the principal monomer, this monomer raw material may also contain other monomers (copolymer components) as optional components. These "other monomers" may be of one or two or more kinds selected from various monomers that are copolymerizable with the alkyl (meth)acrylate used here. For example, an ethylenically unsaturated monomer having one or two or more functional groups selected from the carboxyl, hydroxyl, amino, amido, epoxy, alkoxysilyl and other groups (functional group-containing monomer) can be used. Of these, it is desirable to use acrylic acid and/or methacrylic acid. This functional group-containing monomer is used as a constituent of the monomer raw material together with the alkyl (meth) acrylate that is the principal monomer, and can serve to introduce crosslinking points into the acrylic polymer obtained from the monomer raw material. The type and proportion (copolymer percentage) of the functional group-containing monomer can be set appropriately according to the type and amount of crosslinking agent used, the type of crosslinking reaction, the desired degree of crosslinking (crosslinking density) and the like.

The PSA composition used in the method of the present invention can be obtained by subjecting such a monomer raw material to emulsion polymerization. The mode of emulsion polymerization is not particularly limited, and for example various monomer supply methods, polymerization conditions (temperature, time, pressure and the like), and materials (polymerization initiator, surfactant and the like) can be used as in known conventional emulsion polymerization. For example, the monomer raw material can be supplied all at once, gradually (dropwise) or portionwise, etc. All or part of the monomer raw material may also be mixed and emulsified with water in advance, and the emulsion then supplied to the reaction vessel.

Polymerization can be carried out, for example, at about 20 to 100° C. (typically 40 to 80° C.). Examples of polymerization initiators include azo initiators, peroxide initiators, redox initiators and the like, but are not limited to these. The polymerization initiator can be used in the amount of about 0.005 to 1 part by mass for example per 100 parts by mass of the monomer raw material.

An anionic emulsifier such as sodium lauryl sulfate, ammonium lauryl sulfate, sodium dodecyl benzene sulfonate, or sodium polyoxyethylene lauryl sulfate or a nonionic emulsifier such as polyoxyethylene alkylether, polyoxyethylene alkylphenylether or the like, for example, can be used as the emulsifier (surfactant). One such emulsifier may be used or two or more may be used in combination. The emulsifier can be used in the amount of, for example, about 0.2 to 10 parts by mass (preferably about 0.5 to 5 parts by mass) per 100 parts by mass of the monomer raw material.

Various conventionally known chain transfer agents (which can also be seen as molecular weight adjusters or polymerization degree adjusters) can be used as necessary in polymerization. One or two or more such chain transfer agents may be selected from dodecyl mercaptan (dodecanethiol), glycidyl mercaptan, 2-mercaptoethanol and other mercaptans for example. Of these, dodecanethiol is desirable. The chain transfer agent can be used in the amount of, for example, about 0.001 to 0.5 parts by mass per 100 parts by mass of the monomer raw material. It can also be used in the amount of about 0.02 to 0.05 parts by mass.

Although this is not a limitation, emulsion polymerization can be performed so that the mass percentage of insoluble matter (gel fraction) remaining after ethyl acetate extraction of the resulting acrylic polymer is 0 mass % to less than 15 mass %. It can also be performed so that the mass-average molecular weight (Mw) of the tetrahydrofuran(THF)-soluble matter of the acrylic polymer is about $50 \times 10^4$ to $100 \times 10^4$, for example, based on standard polystyrene.

A crosslinking agent selected from the common crosslinking agents such as the carbodiimide crosslinking agents, hydrazine crosslinking agents, epoxy crosslinking agents, isocyanate crosslinking agents, oxazoline crosslinking agents, aziridine crosslinking agents, metal chelate crosslinking agents, silane coupling agents and the like can be compounded as necessary into the PSA composition (preferably the acrylic aqueous emulsion-type PSA composition) used in the method disclosed here. One such crosslinking agent may be used alone or two or more may be used in combination. The amount of the crosslinking agent used is not particularly limited, but is generally such as to achieve a mass percentage of about 15 to 70 mass % (for example, about 30 to 55 mass %) of insoluble matter (gel fraction) remaining after ethyl acetate extraction of the PSA formed from the composition (that is, the PSA after crosslinking with the aforementioned crosslinking agent).

A tackifier may also be compounded in the PSA composition. One or two or more tackifying resins selected from the rosin resins, rosin derivative resins, petroleum resins, terpene resins, phenol resins, ketone resins and other tackifying resins can be used as this tackifier. The compounded proportion of the tackifier can generally be about 50 parts by mass or less, for example, based on solid content (nonvolatile content) per 100 parts by mass of the polymer component (for example, the acrylic polymer in the case of an acrylic aqueous emulsion-type PSA composition). Normally, a suitable compounded proportion is about 30 parts by mass or less. There is no particular lower limit on the tackifier content, but normally good effects are obtained if it is at least 1 part by mass per 100 parts by mass of the polymer component.

A tackifier with a softening point of about 140° C. or higher (typically 140 to 180° C.), for example, can be adopted for purposes of increasing the cohesive strength in high-temperature environments. Examples of tackifiers having such a softening point include those available from Arakawa Chemical Industries under the trade names "Super Ester E-865", "Super Ester E-865NT", "Super Ester E-650", "Super Ester E-786-60", "Tamanol E-100", "Tamanol E-200", "Tamanol 803L", "Pensel D-160" and "Pensel KK"; and those available from Yasuhara Chemical under the trade names "YS Polystar S", "YS Polystar T", "Mighty Ace G" and the like, but are not limited to these. One such tackifier may be used, or two or more may be used in combination. It is desirable that the tackifier be in the form of an aqueous dispersion (tackifier emulsion), and that the tackifier emulsion contain effectively no organic solvent.

This PSA composition may also contain acids or bases (ammonia water or the like) used to adjust the pH. Other optional components that can be contained in the composition include viscosity adjusters, leveling agents, plasticizers, fillers, pigments, dyes and other colorants, stabilizers, preservatives, antioxidants and various other additives that are commonly used in the field of aqueous PSA compositions. A known wetting agent can also be added to the PSA composition to increase the ability of the PSA to impregnate the nonwoven fabric substrate. Adding such a wetting agent is particularly effective when a PSA layer is formed on at least one side of the nonwoven fabric substrate by the direct method. These various additives may be known additives used by ordinary methods, and since they are not particular features of the present invention they are not explained in detail.

With the method for producing a double-sided PSA sheet disclosed here, it is possible, using an aqueous dispersion-type PSA composition, to efficiently produce a double-sided PSA sheet in which the inherent performance of the PSA (such as adaptability to the surface of an adherend) is more properly reflected. For example, a double-sided PSA sheet of the present invention produced by this method may be a highly repulsion resistant (or in other words low-repulsion) double-sided PSA sheet, the peeling height of which in a repulsion resistance evaluation test (described below) is about 5 mm or less (or preferably 3 mm or less, or more preferably 1 mm or less).

The reason for these desirable effects is not entirely clear, but may be as follows for example. That is, it may be that the impregnation behavior of the composition in the nonwoven fabric substrate is different from that of a solvent-based system because the aqueous dispersion-type PSA composition and/or a PSA formed from this composition (PSA film) is a heterogeneous system unlike a solvent-based PSA composition, and because the surface tension of the dispersion medium is greater than in a solvent-based system among other reasons. The reason that the properties of PSAs alone have not been reflected in the properties of double-sided PSA sheets in the past may have been that such differences in impregnation behavior and degree of impregnation have not been adequately assessed. In the present invention, the degree of impregnation of the PSA is assessed in terms of gap area, and by controlling the degree of impregnation using this gap area as a benchmark, it is possible to use an aqueous dispersion-type PSA composition to efficiently produce a double-sided PSA sheet in which the inherent performance of the PSA (repulsion resistance for example) is more properly reflected.

In a desirable mode of the method for producing a double-sided PSA sheet disclosed here, the preferred gap area described above is achieved not only when the double-sided PSA sheet is stored after preparation under conditions that serve to improve impregnation of the sheet (for example, conditions under which compressive stress is applied in the direction of thickness of the sheet at room temperature or with heating), but also when it is not stored under such conditions (for example, when the gap area is measured by the method described below for evaluating impregnation of the substrate after the sheet has been stored after preparation for 3 days in a 50° C. environment without any particular pressure as in the example below). For example, in an ordinary roll of double-sided PSA tape, the tape in the inner part of the roll is under winding stress in the direction of thickness, but by applying the method disclosed here, it is possible to produce a double-sided PSA sheet (adhesive tape) in which the desirable gap area described above is achieved even in the outermost part of the roll (which is effectively under no winding stress). Consequently, the desirable effects described above can be achieved in all parts of the roll of double-sided PSA tape, from the outer part (surface part, end which is used first) to the inner part.

EXAMPLES

Some examples of the present invention are explained here, but it is not intended that the present invention be limited by these examples. When not otherwise specified, the terms "part" and "%" in the following explanation are based on mass.

Example 1

0.279 g of 2,2'-azobis[N-(2-carboxyethyl)-2-methylpropionamidine]hydrate (polymerization initiator) (trade name "VA-057", available from Wako Pure Chemical Industries) and 100 g of ion-exchanged water were placed in a reaction vessel equipped with a condenser, a nitrogen inlet, a thermometer and a stirrer, and stirred for 1 hour as nitrogen gas was introduced. This was maintained at 60° C., and 400 g of a monomer raw material emulsion (obtained by adding 29 parts butyl acrylate (BA), 67 parts 2-ethylhexyl acrylate (2EHA), 4 parts acrylic acid (AA), 0.5 parts diacetone acrylamide (DAAM), 0.04 parts dodecanethiol (chain transfer agent) and 2 parts sodium polyoxyethylene lauryl sulfate (emulsifier) to 41 parts of ion-exchanged water and emulsifying) were gradually added dropwise over 4 hours to promote emulsion polymerization reaction. After completion of the addition, this was cured (aged) by storing it for 3 hours at the same temperature. 10% ammonium water was added to adjust the pH of the liquid to 7.5. In this way, an acrylic polymer aqueous dispersion (emulsion) was obtained. This acrylic polymer emulsion is sometimes called "emulsion (a)" below.

The mass-average molecular weight (Mw) of the soluble part obtained by THF extraction of the acrylic polymer in emulsion (a) was $66.8 \times 10^4$ (based on standard polystyrene). The mass percentage of the ethyl acetate-insoluble component of this acrylic polymer was 0%.

A tackifier emulsion (brand name "Super Ester E-865NT", aqueous dispersion of polymerized rosin resin with a softening point of 160° C., available from Arakawa Chemical Industries) was added to emulsion (a) in the amount of 20 parts (based on solid content) per 100 parts of acrylic polymer in emulsion (a). Adipic acid dihydrazide (ADH) was also added as a hydrazine crosslinking agent in the amount of 0.1 parts per 100 parts of acrylic polymer. In addition, 1,3-bis(N, N-diglycidylaminomethyl)cyclohexane (trade name "Tetrad-C", available from Mitsubishi Gas Chemical Co. Inc.) was added as an epoxy crosslinking agent in the amount of 0.01 parts per 100 parts of acrylic polymer to finally obtain the PSA composition. This PSA composition is sometimes called "PSA composition (A)" below.

The aforementioned PSA composition (A) was applied to a nonwoven fabric substrate to obtain a double-sided PSA sheet. In this example, the nonwoven fabric substrate was a hemp pulp nonwoven fabric (viscose treated) with a grammage of 12 g/m$^2$, a thickness of 45 μm and a bulk density of 0.27 g/cm$^3$ (tissue paper available from Nippon Daishowa Paperboard, brand name "Hakuyoushi 123"; hereunder sometimes called "nonwoven fabric a").

That is, PSA composition (A) was applied on a release liner obtained by treating high-quality paper with a silicone release agent. This was dried for 3 minutes at 100° C. to form a PSA film about 70 μm thick on the liner. Two such release liners with PSA films were prepared. One of the release liners with PSA film was laminated on one side of the nonwoven fabric substrate. The second release liner with PSA film was affixed to the other side of the nonwoven fabric substrate. In this way, the double-sided PSA sheet of Example 1 was obtained with PSA films laminated on both sides of a nonwoven fabric substrate (that is, by the double-sided transfer method of transferring PSA films to both sides of a nonwoven fabric substrate). Both adhesive surfaces of this double-sided PSA sheet were thus protected as is by the release liners used to prepare the PSA sheet.

After being prepared, the resulting double-sided PSA sheet was stored for 3 days in a 50° C. environment, and subjected to the following evaluation testing. The mass percentage of the ethyl acetate insoluble component in an adhesive sample taken from this PSA sheet after storage was 34%.

(Evaluation of Substrate Impregnation)

This double-sided PSA sheet was cut in the direction of thickness along a cutting line perpendicular to the machine direction of the nonwoven fabric substrate in the sheet, and steam dyed for 5 hours at 50° C. with a 4% aqueous osmium (Os) solution. A sample was cut out with a microtome, fixed to a sample stand with conductive adhesive tape, and subjected to Pt—Pd sputtering for 20 seconds. The cross-section of the sample prepared in this way was observed under the following conditions.

Equipment: Hitachi High-Technologies field emission scanning electron microscope, Model No. S-4800;

Measurement conditions: Secondary electron image observed at an acceleration voltage of 3 kV (300× magnification).

The resulting SEM image was analyzed with commercial image analysis software (Asahi Kasei Engineering, trade name "A-zo-kun") to determine the area of gaps observed per 400 μm of length of the sample cross-section [μm$^2$/400 μm]. The analysis mode of the image analysis software was set to "particle analysis". When setting the analysis conditions, the threshold value between gap and no-gap was set so as to properly identify those parts with actual gaps based on observation of individual SEM images. Parts that were obviously different from the gaps targeted for measurement (that is, gaps illustrating the degree of impregnation of the nonwoven fabric), such as cracks occurring in the adhesive layers during preparation of the sample for observation, were not included when calculating the gap area. This gap area was determined for three different cross-sections (n=3) at different cutting positions in the machine direction of the nonwoven fabric substrate, and the average of these was given as the gap area of the double-sided PSA sheet. As a result, the gap area of the double-sided PSA sheet of this example was 99 μm$^2$/400 μm.

(Evaluation of Repulsion Resistance)

The release liner protecting one surface of the aforementioned double-sided PSA sheet was peeled off, and the exposed PSA layer was laminated on an aluminum plate 0.5 mm thick, 10 mm wide and 90 mm long to prepare a test piece. The length of this test piece was wound in an arc around a round bar 50 mm in diameter, the release liner was then peeled off the other surface of the test piece to expose the PSA layer, which was then crimped to a polypropylene plate using a laminator. This was stored for 24 hours in a 23° C. environment and then heated for 2 hours at 70° C., and the height (mm) of test piece floating above the surface of the polypropylene plate was measured. This measurement was performed on three test pieces (n=3), and the average value was given as the peeling height of the double-sided PSA sheet. As a result, the peeling height (repulsion resistance) of the double-sided PSA sheet of this example was 0.6 mm.

Example 2

The aforementioned PSA composition (A) was applied to a nonwoven fabric substrate different from that of Example 1 to prepare a double-sided PSA sheet. That is, a nonwoven fabric of 80% hemp and 20% pulp with a grammage of 7 g/m$^2$, a thickness of 18 μm and a bulk density of 0.39 g/cm$^3$ (tissue paper available from Nippon Daishowa Paperboard; hereunder sometimes called "nonwoven fabric b") was used as the nonwoven fabric substrate in this example. In all other respects, the double-sided PSA sheet of Example 2 was prepared as in Example 1. This double-sided PSA sheet was evaluated as in Example 1. The gap area was 182 μm$^2$/400 μm and repulsion resistance (peeling height) was 2.6 mm.

Example 3

A rayon nonwoven fabric with a grammage of 14 g/m$^2$, a thickness of 45 μm and a bulk density of 0.31 g/cm$^3$ (rayon paper available from Nakao Seishi Co., trade name "Bonlite-P14G"; hereunder sometimes called "nonwoven fabric c") was used as the nonwoven fabric substrate in this example. In all other respects, the double-sided PSA sheet of Example 3 was prepared as in Example 1. This double-sided PSA sheet was evaluated as in Example 1. The gap area was 204 μm$^2$/400 μm. and repulsion resistance (peeling height) was 2.6 mm.

Example 4

A wood pulp nonwoven fabric with a grammage of 11 g/m$^2$, a thickness of 30 μm and a bulk density of 0.37 g/cm$^3$ (trade name "NP-11-P", available from Daifuku Seishi; hereunder sometimes called "nonwoven fabric d") was used as the nonwoven fabric substrate in this example. In all other respects, the double-sided PSA sheet of Example 4 was prepared as in Example 1. This double-sided PSA sheet was evaluated as in Example 1. The gap area was 359 μm$^2$/400 μm, and repulsion resistance (peeling height) was 4.0 mm.

Example 5

A pulp nonwoven fabric with a grammage of 14 g/m², a thickness of 28 μm and a bulk density of 0.50 g/cm³ (trade name "AP-14N Genshi", available from Nippon Daishowa Paperboard; hereunder sometimes called "nonwoven fabric e") was used as the nonwoven fabric substrate in this example. In all other respects, the double-sided PSA sheet of Example 5 was prepared as in Example 1. This double-sided PSA sheet was evaluated as in Example 1. The gap area was 746 μm²/400 μm, and the repulsion resistance (peeling height) was 9.6 mm.

Example 6

An 80% hemp, 20% pulp nonwoven fabric with a grammage of 11 g/m², a thickness of 55 μm and a bulk density of 0.20 g/cm³ (tissue paper available from Nippon Daishowa Paperboard; hereunder sometimes called "nonwoven fabric f") was used as the nonwoven fabric substrate in this example. In all other respects, the double-sided PSA sheet of Example 6 was prepared as in Example 1. This double-sided PSA sheet was evaluated as in Example 1. The gap area was 1175 μm²/400 μm, and the repulsion resistance (peeling height) was 6.0 mm.

Example 7

A pulp nonwoven fabric with a grammage of 14 g/m², a thickness of 42 μm and a bulk density of 0.33 g/cm³ (trade name "SP-14K Genshi", available from Daifuku Seishi; hereunder sometimes called "nonwoven fabric g") was used as the nonwoven fabric substrate in this example. In all other respects, the double-sided PSA sheet of Example 7 was prepared as in Example 1. This double-sided PSA sheet was evaluated as in Example 1. The gap area was 1461 μm²/400 μm, and the repulsion resistance (peeling height) was 11.1 mm.

Example 8

Using the same PSA film used to prepare the double-sided PSA sheets of Examples 1 to 7, the repulsion resistance of the PSA film itself (PSA sheet without substrate) was evaluated. That is, a release liner with PSA film was prepared having a 70 μm thick PSA film formed from PSA composition (A) as in Example 1, and a test piece was prepared by laminating on the aforementioned aluminum plate this release liner with PSA film instead of the double-sided PSA sheets of Examples 1 to 7. In all other respects, the repulsion resistance was evaluated as in Example 1. As a result, the PSA sheet without substrate obtained from PSA composition (A) had a repulsion resistance of 0.4 mm.

These evaluation results are shown in Table 1 together with the properties (grammage, thickness and density) of the nonwoven fabric substrates used. It is clear from this table that the double-sided PSA sheets of Examples 1 through 4, which have PSA layers impregnating the nonwoven fabric substrate to such a degree that the gap area is 500 μm²/400 μm or less (specifically 400 μm²/400 μm or less), all have repulsion resistance comparable to that of a PSA sheet without substrate (Example 8) regardless of the different properties of the nonwoven substrates used, and specifically have good repulsion resistance as shown by a peel height of 5 mm or less (more specifically 4 mm or less). The double-sided PSA sheets of Examples 1 through 3, which have gap areas of 250 μm²/400 μm or less, exhibit even better repulsion resistance (specifically, peeling heights of 3 mm or less), and the double-sided PSA sheet of Example 1, which has a gap area of 100 μm²/400 μm or less, exhibits excellent repulsion resistance (with a peeling height of 1 mm or less).

TABLE 1

| | Nonwoven fabric substrate | Grammage [g/m²] | Thickness [μm] | Density [g/cm³] | Gap area [μm²/400 μm] | Repulsion resistance [mm] |
|---|---|---|---|---|---|---|
| Ex. 1 | a | 12 | 45 | 0.27 | 99 | 0.6 |
| Ex. 2 | b | 7 | 18 | 0.39 | 182 | 2.6 |
| Ex. 3 | c | 14 | 45 | 0.31 | 204 | 2.6 |
| Ex. 4 | d | 11 | 30 | 0.37 | 359 | 4.0 |
| Ex. 5 | e | 14 | 28 | 0.50 | 746 | 9.6 |
| Ex. 6 | f | 11 | 55 | 0.20 | 1175 | 6.0 |
| Ex. 7 | g | 14 | 42 | 0.33 | 1461 | 11.1 |
| Ex. 8 | None | — | — | — | — | 0.4 |

Example 9

Two release liners with 70 μm-thick PSA films formed from PSA composition (A) were prepared as in Example 1. One of these release liners with PSA film was laminated on one surface of the same nonwoven fabric substrate (nonwoven fabric g) as in Example 7. A dilution of PSA composition (A) was supplied to the other surface (with nonwoven fabric substrate exposed) of the nonwoven fabric substrate so as to thoroughly penetrate the exposed substrate on that side, and dried for 1 minute at 100° C. To prepare the dilution, water was added to PSA composition (A) to a solids concentration of 32%. The second release liner with PSA film was then laminated on the side of the nonwoven fabric substrate which had received this pre-treatment (pre-impregnation treatment).

The double-sided PSA sheet of Example 9 prepared in this way was evaluated as in Example 1. As a result, the gap area of the double-sided PSA sheet of this example was 110 μm²/400 μm, and the repulsion resistance (peeling height) was 2.6 mm.

The evaluation results for the double-sided PSA sheet of Example 9 are shown in Table 2 together with the evaluation results for the double-sided PSA sheet of Example 7, which was prepared using the same nonwoven fabric substrate. It is clear from Table 2 that while the double-sided PSA tape obtained by the production method described in Example 7 (method of transferring (laminating) pre-prepared PSA films to both sides of the nonwoven fabric substrate) had a large gap area and low repulsion resistance, a double-sided PSA sheet with a sufficiently lower gap area could be obtained by the production method of Example 9 even using the same nonwoven fabric substrate, and that repulsion resistance was improved as the gap area was reduced.

TABLE 2

| | Nonwoven fabric substrate | Pre-impregnation treatment | Gap area [μm²/400 μm] | Repulsion resistance [mm] |
|---|---|---|---|---|
| Ex. 9 | g | yes | 110 | 2.6 |
| Ex. 7 | g | no | 1461 | 11.1 |

Example 10

0.279 g of a polymerization initiator (same "VA-057" used in Example 1) and 100 g of ion-exchanged water were placed in a reaction vessel equipped with a condenser, a nitrogen inlet, a thermometer and a stirrer, and stirred for 1 hour as nitrogen gas was introduced. This was maintained at 60° C., and 200 g of a monomer raw material emulsion for first-stage polymerization (obtained by adding 29 parts BA, 67 parts 2EHA, 4 parts AA, 0.03 parts dodecanethiol (chain transfer agent) and 2 parts sodium polyoxyethylene lauryl sulfate (emulsifier) to 41 parts of ion-exchanged water and emulsifying) were gradually added dropwise over 2 hours to promote emulsion polymerization reaction.

Next, 200 g of a monomer raw material emulsion for second-stage polymerization (obtained by adding 29 parts BA, 67 parts 2EHA, 4 parts AA, 0.045 parts dodecanethiol and 2 parts sodium polyoxyethylene lauryl sulfate to 41 parts of ion-exchanged water and emulsifying) were gradually added dropwise over 2 hours, and the emulsion polymerization reaction proceeded at the same temperature.

After completion of the addition, this was cured (aged) by maintaining it for 3 hours at the same temperature. 10% ammonium water was added to adjust the pH of the liquid to 7.5. In this way, an acrylic polymer aqueous dispersion (emulsion) was obtained. This acrylic polymer emulsion is sometimes called "emulsion (b)" below.

The mass-average molecular weight (Mw) of the soluble part obtained by THF extraction of the acrylic polymer in emulsion (b) was $82.4 \times 10^4$ (based on standard polystyrene). The mass percentage of the ethyl acetate-insoluble component of this acrylic polymer was 5%.

A tackifier emulsion (trade name "Super Ester E-865NT", available from Arakawa Chemical Industries) was added to so obtained emulsion (b) in the amount of 20 parts (based on solid content) per 100 parts of acrylic polymer in emulsion (b). In addition, "Carbodirite V-04" from Nisshin Boseki (aqueous solution-type carbodiimide crosslinking agent) was also added as a carbodiimide crosslinking agent in the amount of 0.4 parts (as solids) per 100 parts of the acrylic polymer to obtain a PSA composition. This PSA composition is sometimes called "PSA composition (B)" below.

The aforementioned PSA composition (B) was applied to the same nonwoven fabric substrate used in Example 2 (nonwoven fabric b) to prepare the double-sided PSA sheet of Example 10. This PSA sheet was prepared as in Example 2 (by double-sided transfer) except that PSA composition (B) was used instead of PSA composition (A).

When this double-sided PSA sheet was subjected to evaluation testing as in Example 1, the gap area was 62 μm²/400 μm and the repulsion resistance (peeling height) was 0.4 mm. The mass percentage of the ethyl acetate-insoluble component in an adhesive sample taken from the PSA sheet after it had been stored for 3 days in a 50° C. environment after preparation was 49%.

Example 11

Using the PSA film used to prepare the double-sided PSA sheet of Example 10, the repulsion resistance of the PSA film itself (PSA sheet without substrate) was evaluated. That is, using the same methods as in Example 1 except that PSA composition (B) was used instead of PSA composition (A), a release liner with PSA film was prepared having a 70 μm thick PSA film formed from PSA composition (B), and a test piece was prepared by laminating this release liner with PSA film on the aforementioned aluminum plate. In all other respects, the repulsion resistance was evaluated as in Example 1. As a result, the PSA sheet without substrate obtained from PSA composition (B) had a repulsion resistance of 1.9 mm.

These evaluation results are shown in Table 3 together with the properties of the nonwoven fabric substrates used. It is clear from Table 3 that in the double-sided PSA tape of Example 10 prepared using PSA composition (B), a PSA layer was also formed thoroughly impregnating the nonwoven fabric substrate so as to achieve a gap area of 500 μm²/400 μm or less (specifically 100 μm²/400 μm or less) to thereby achieve repulsion resistance equal to or greater than that of a PSA sheet without substrate (Example 11).

TABLE 3

| | Nonwoven fabric substrate | Grammage [g/m²] | Thickness [μm] | Density [g/cm³] | Gap area [μm²/ 400 μm] | Repulsion resistance [mm] |
|---|---|---|---|---|---|---|
| Ex. 10 | b | 7 | 18 | 0.39 | 62 | 0.4 |
| Ex. 11 | none | — | — | — | — | 1.9 |

Figure 3:
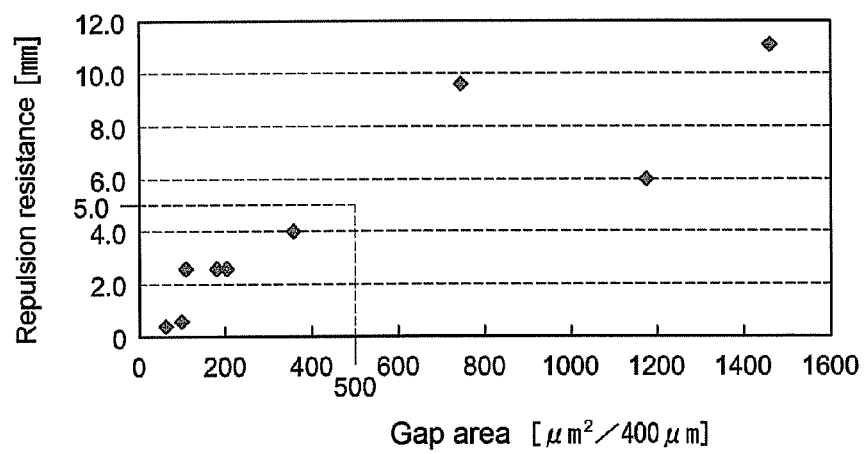
FIG. 3 is a chart showing the relationship between the gap area and repulsion resistance of a double-sided PSA sheet.

FIG. 3 is a graph where the evaluation results from Examples 1 through 7 and Examples 9 and 10 are plotted with the gap area of the double-sided PSA sheet of each example on the horizontal axis and the repulsion resistance on the vertical axis. As shown in this FIG. 3, when the gap area was in the range of 500 μm²/400 μm or less, there was a strong correlation between gap area and repulsion resistance despite differences in the properties of the nonwoven fabric substrates used in each example and despite differences in the methods for preparing the PSA compositions, differences in crosslinking methods and differences in the methods of preparing the double-sided PSA sheets.

Figure 4:
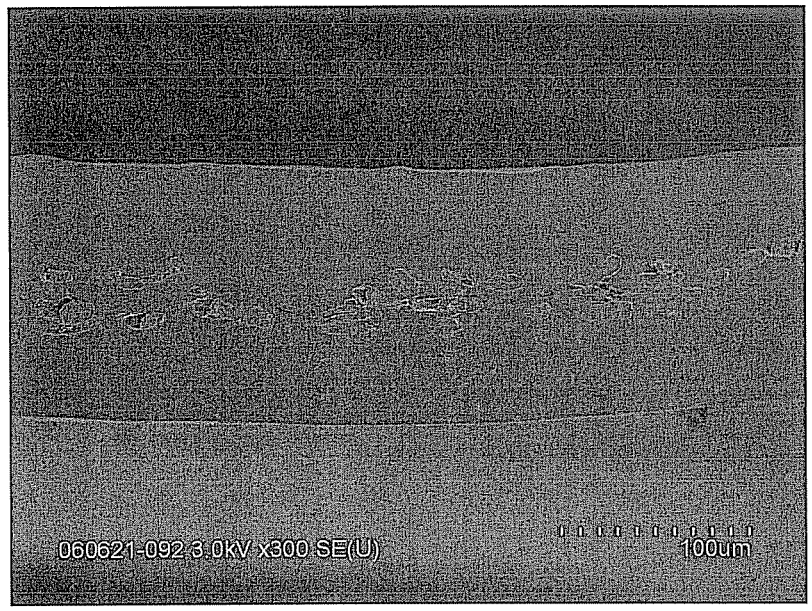
FIG. 4 is a SEM image showing a cross-section of the double-sided PSA sheet of Example 1.
Figure 5:
FIG. 5 is a SEM image showing a cross-section of the double-sided PSA sheet of Example 2.
Figure 6:
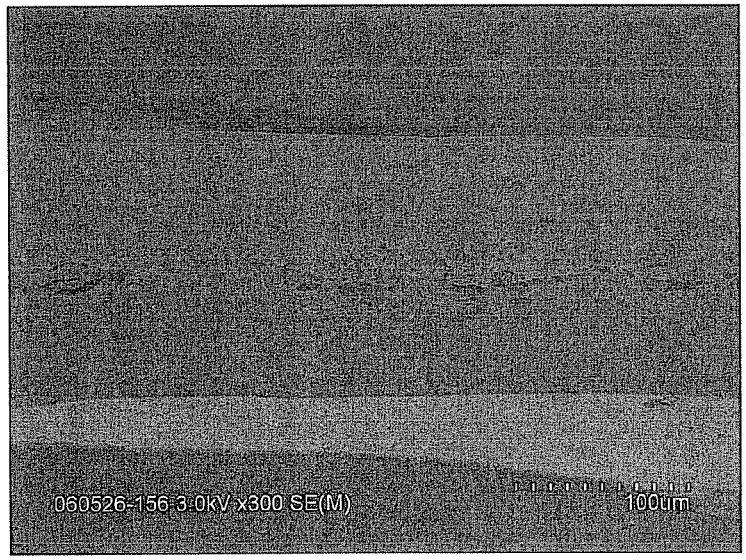
FIG. 6 is a SEM image showing a cross-section of the double-sided PSA sheet of Example 7.
Figure 7:
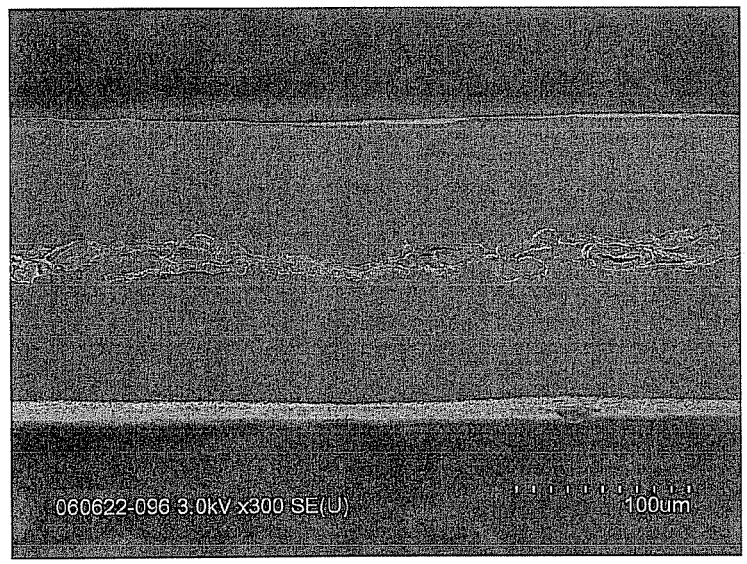
FIG. 7 is a SEM image showing a cross-section of the double-sided PSA sheet of Example 9.
Figure 8:
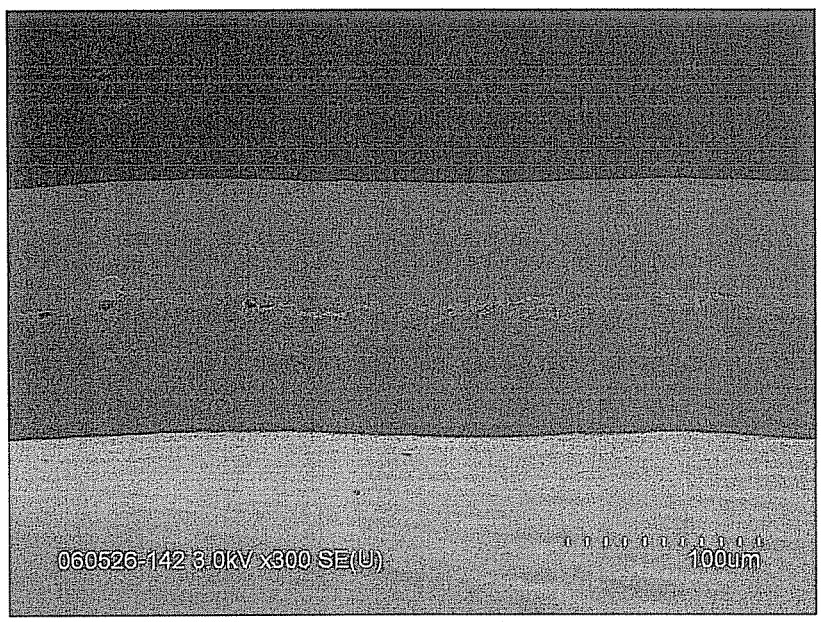
FIG. 8 is a SEM image showing a cross-section of the double-sided PSA sheet of Example 10.

FIG. 4 shows a typical SEM image (magnification 300×) of a cross-section perpendicular to the machine direction of the double-sided PSA sheet of Example 1. Similarly, FIG. 5 shows a cross-sectional SEM image of the double-sided PSA sheet of Example 2, FIG. 6 shows a cross-sectional SEM image of the double-sided PSA sheet of Example 7, FIG. 7 shows a cross-sectional SEM image of the double-sided PSA sheet of Example 9, and FIG. 8 shows a cross-sectional SEM image of the double-sided PSA sheet of Example 10. In the double-sided PSA sheets with small gap areas, the PSA layer can be seen to fill the spaces between the fibers making up the nonwoven fabric substrate (that is, thoroughly impregnating the nonwoven fabric substrate).

As explained above, with the method for producing a double-sided PSA sheet of the present invention, it is possible to obtain a high-performance double-sided PSA sheet in which the inherent adhesive performance of the PSA formed from the PSA composition used is more properly reflected. For example, a double-sided PSA sheet with excellent adaptability to the surface of an adherend (which is resistant to floating, peeling and the like even when laminated on an adherend with a complex surface shape) can be produced. Because of these properties, this double-sided PSA sheet can be used favorably as a double-sided PSA sheet for fixing automobile interior parts or the like.

What is claimed is:

1. A method for producing a double-sided pressure-sensitive adhesive sheet having pressure-sensitive adhesive layers formed using an aqueous dispersion-type pressure-sensitive adhesive composition and a nonwoven fabric substrate supporting the pressure-sensitive adhesive layers, said method comprising:
   preparing an aqueous dispersion-type pressure-sensitive adhesive composition;
   preparing a nonwoven fabric substrate as a support, wherein the nonwoven fabric substrate has a grammage of 5 g/m² to 25 g/m², a thickness of 15 μm to 70 μm, and a bulk density of 0.2 g/cm³ to 0.5 g/cm³; and forming pressure-sensitive adhesive layers which are integrated in the nonwoven fabric substrate and which are obtained by drying said pressure-sensitive adhesive composition, wherein said pressure-sensitive adhesive layers are integrated in the nonwoven fabric substrate so that the area of gaps observed in a vertical cross-section perpendicular to the machine direction of said nonwoven fabric substrate is 500 μm² or less per 400 μm length of the vertical cross-section, the pressure-sensitive adhesive composition is an aqueous emulsion-type pressure-sensitive adhesive composition comprising an acrylic polymer in an amount of over 50 mass % based on the solid part of the pressure-sensitive adhesive composition, the nonwoven fabric substrate is composed of natural fiber or at least one chemical fiber selected from the group consisting of rayon, acetate fiber, polyester fiber, polyvinyl alcohol fiber, polyamide fiber, polyolefin fiber, and polyurethane fiber, and a peeling height of the double-sided pressure-sensitive adhesive sheet in a repulsion resistance evaluation is 5 mm or less, wherein the repulsion resistance evaluation test is conducted by a method comprising the steps of:

peeling off a release liner protecting one surface of the double sided pressure-sensitive adhesive sheet;

laminating the exposed pressure-sensitive adhesive layer on an aluminum plate 0.5 mm thick, 10 mm wide, and 90 mm long to prepare a test piece;

winding the length of the test piece in an arc around a round bar 50 mm in diameter;

peeling off the release liner from the outer surface of the test piece to expose the pressure-sensitive adhesive layer, which is then crimped to a polypropylene plate using a laminator;

storing the test piece crimped to the polypropylene plate for 24 hours in a 23° C. environment and then heated for 2 hours at 70° C.; and measuring the height (mm) of the test piece floating above the surface of the polypropylene plate.

2. The method of claim 1, wherein said pressure-sensitive adhesive layers are formed by laminating pressure-sensitive adhesive films, which are obtained by drying said aqueous dispersion-type pressure-sensitive adhesive composition, on both sides of said nonwoven fabric substrate.

3. The method of claim 1, wherein forming pressure-sensitive adhesive layers comprises (1) a pre-integration pretreatment wherein the nonwoven fabric substrate is impregnated with a dilution of the aqueous dispersion-type pressure-sensitive adhesive composition, which is then dried to form a pre-impregnated nonwoven fabric substrate, followed by (2) forming one or more pressure-sensitive adhesive layers on the pre-impregnated nonwoven fabric substrate, which are then dried.

4. The method of claim 1, further comprising selecting a nonwoven fabric substrate with which a gap area of 500 μm² or less per 400 μm length of a vertical cross-section can be achieved when said pressure-sensitive adhesive layers are formed by laminating pressure-sensitive adhesive films, which are obtained by drying said aqueous dispersion-type pressure-sensitive adhesive composition, on both sides of said nonwoven fabric substrate, and obtaining the double-sided pressure-sensitive adhesive sheet with the gap area of 500 μm² or less per 400 μm length of the vertical cross-section by using the selected nonwoven fabric substrate as the support.

5. The method of claim 1, further comprising cutting the double-sided pressure-sensitive adhesive sheet in the direction of thickness along a cutting line perpendicular to the machine direction of the nonwoven fabric substrate in the sheet, and determining the area of gaps observed per 400 μm length of the vertical cross-section.

6. The method of claim 1, further comprising forming pressure-sensitive adhesive films by drying the pressure-sensitive adhesive composition, and laminating the pressure-sensitive adhesive films on both sides of the nonwoven fabric substrate.

7. The method of claim 1, wherein the nonwoven fabric substrate is impregnated with a binder.

8. The method of claim 1, wherein nonwoven fabric substrate is impregnated with at least one binder selected from the group consisting of viscose, polyvinyl alcohol (PVA), and polyacrylamide.

9. The method of claim 1, wherein said pressure-sensitive adhesive layers are integrated in the nonwoven fabric substrate so that the area of gaps observed in a vertical cross section perpendicular to the machine direction of said nonwoven fabric substrate is 250 μm² or less per 400 μm length of the vertical cross-section.

10. The method of claim 1, wherein the nonwoven fabric substrate is composed of a natural fiber comprising manila hemp.

11. The method of claim 1, wherein the nonwoven fabric substrate is a hemp pulp nonwoven fabric substrate impregnated with viscose.

12. The method of claim 1, wherein the nonwoven fabric substrate comprises 80% by weight or more of hemp.

13. The method of claim 1, wherein the aqueous dispersion-type pressure sensitive adhesive composition comprises a chain transfer agent.

14. The method of claim 1, wherein the aqueous dispersion-type pressure sensitive adhesive composition comprises an emulsifier.

15. The method of claim 1, wherein the thickness of the pressure-sensitive adhesive layer is 1 to 5 times the thickness of the nonwoven fabric substrate.

16. The method of claim 1, wherein said pressure-sensitive adhesive layers are integrated in the nonwoven fabric substrate so that the area of gaps observed in a vertical cross section perpendicular to the machine direction of said nonwoven fabric substrate is 100 μm² or less per 400 μm length of the vertical cross-section.

17. The method of claim 1, wherein a peeling height of which in a repulsion resistance evaluation is 3 mm or less, wherein the repulsion resistance evaluation test is conducted by a method comprising the steps of:

peeling off a release liner protecting one surface of the double sided pressure-sensitive adhesive sheet;

laminating the exposed pressure-sensitive adhesive layer on an aluminum plate 0.5 mm thick, 10 mm wide, and 90 mm long to prepare a test piece;

winding the length of the test piece in an arc around a round bar 50 mm in diameter;

peeling off the release liner from the outer surface of the test piece to expose the pressure-sensitive adhesive layer, which is then crimped to a polypropylene plate using a laminator;

storing the test piece crimped to the polypropylene plate for 24 hours in a 23° C. environment and then heated for 2 hours at 70° C.; and measuring the height (mm) of the test piece floating above the surface of the polypropylene plate.

18. The method of claim 1, wherein a peeling height of which in a repulsion resistance evaluation is 1 mm or less, wherein the repulsion resistance evaluation test is conducted by a method comprising the steps of:

peeling off a release liner protecting one surface of the double sided pressure-sensitive adhesive sheet;

laminating the exposed pressure-sensitive adhesive layer on an aluminum plate 0.5 mm thick, 10 mm wide, and 90 mm long to prepare a test piece;

winding the length of the test piece in an arc around a round bar 50 mm in diameter;

peeling off the release liner from the outer surface of the test piece to expose the pressure-sensitive adhesive layer, which is then crimped to a polypropylene plate using a laminator;

storing the test piece crimped to the polypropylene plate for 24 hours in a 23° C. environment and then heated for 2 hours at 70° C.; and measuring the height (mm) of the test piece floating above the surface of the polypropylene plate.

19. The method of claim 1, wherein the aqueous dispersion-type pressure sensitive adhesive composition comprises a hydrazine crosslinking agent.

\* \* \* \* \*